United States Patent [19]
Inagaki et al.

[11] Patent Number: 5,913,745
[45] Date of Patent: Jun. 22, 1999

[54] DIFFERENTIAL GEAR DEVICE

[75] Inventors: Toshiyuki Inagaki; Toshio Hashimoto, both of Kariya; Akifumi Yamazaki, Anjo, all of Japan

[73] Assignee: Aisin Seiki Kabushiki Kaisha, Kariya, Japan

[21] Appl. No.: 08/845,380

[22] Filed: Apr. 25, 1997

[51] Int. Cl.⁶ .................................................. F16H 57/02
[52] U.S. Cl. ................................................... 475/230
[58] Field of Search .......................................... 475/230

[56] References Cited

U.S. PATENT DOCUMENTS

| | | | |
|---|---|---|---|
| 1,106,149 | 8/1914 | Loomis | 475/230 |
| 1,241,893 | 10/1917 | Alden | 475/230 |
| 1,242,803 | 10/1917 | Herreshoff | 475/230 |
| 1,326,655 | 12/1919 | Frins | 475/230 |
| 1,946,051 | 2/1934 | Alden | 475/230 |
| 2,609,710 | 9/1952 | Osborn | 475/230 |
| 5,106,350 | 4/1992 | Beton | 475/230 |

FOREIGN PATENT DOCUMENTS 8-54096  2/1996  Japan .

*Primary Examiner*—Dirk Wright
*Attorney, Agent, or Firm*—Burns, Doane, Swecker & Mathis, L.L.P.

[57] ABSTRACT

A differential gear device includes a pinion mechanism which transmits driving torque from the engine, and a differential case. The pinion mechanism includes a pinion shaft and a pinion gear, and a bearing is provided on one end of the pinion gear. A differential mechanism is disposed in the differential case and is provided with a ring gear. A differential carrier sets the pinion mechanism onto the differential case to connect the pinion gear with the ring gear. The inner race of the bearing is fixed to the pinion gear and is removable from or separable from the outer race of the bearing.

16 Claims, 3 Drawing Sheets

DIFFERENTIAL GEAR DEVICE

FIELD OF THE INVENTION

The present invention generally relates to a differential gear device for absorbing speed differentials between two rotating elements. More particularly, the present invention pertains to a differential gear device for absorbing differences in rotational speed between a right wheel and a left wheel of a vehicle, or differences in rotational speed between a front wheel and a rear wheel of a vehicle.

BACKGROUND OF THE INVENTION

Generally speaking, in the context of differential gear mechanisms for a vehicle, either an inner race or an outer race of a bearing is fixed to the drive element, while the other race is positioned loose against an immovable element. It is thus possible to tilt the center of the bearing against the center of the drive element.

For this reason, the bearing is fixed onto the pinion shaft because the pinion shaft functions as a drive element which transmits the driving power of an engine, and the center of the pinion shaft and the center of the bearing are equal.

A conventional differential gear device is disclosed in Japanese Patent Application Laid-Open Publication No. 8(1996)-54096. In this differential gear device, a gear positioned between the pinion gear and the ring gear of the differential case must be adjusted when assembling the pinion mechanism and the differential carrier. This is because the gear position is closely related to the strength of the gear and the noise generated by the gear arrangement. This adjustment of the gear position is effected by changing the thickness of a shim that is arranged between the bolt and the pinion mechanism.

However, it has been found that this arrangement suffers from various disadvantages and drawbacks. In one respect, the outer race of the bearing that is arranged on the pinion mechanism may come into contact with the gear of the ring gear during pulling out of the pinion mechanism from the differential gear device. Therefore, the differential case has to be removed in an upward direction of the differential gear device, and then the pinion mechanism must be removed from the differential carrier. Further, the manner of adjustment of the gear position is not very desirable because it increases the assembly time.

SUMMARY OF THE INVENTION

A need exists, therefore, for a differential gear device which overcomes the foregoing drawbacks.

In accordance with the present invention, a differential gear device includes a pinion mechanism for transmitting driving torque, a differential case in which a differential mechanism is disposed, and a differential carrier. The differential case is provided with a ring gear and the pinion mechanism includes a pinion shaft and a pinion gear. The differential carrier is designed to set the pinion mechanism onto the differential case to engage the pinion gear with the ring gear. A bearing is provided at on one end of the pinion gear. The bearing includes an inner race and an outer race, with the inner race of the bearing being secured on the pinion gear and the inner race being removable from the outer race of the bearing.

According to another aspect of the invention, a differential gear device includes a pinion mechanism for transmitting driving torque, a differential case in which a differential mechanism is disposed, and a differential carrier. The pinion mechanism is provided with a pinion shaft and a pinion gear. A bearing is located at on one end of the pinion gear. The bearing includes an inner race, an outer race and an element located between the inner race and the outer race. One of the two races is configured so that it engages only one of the end surfaces of the element. The differential case is provided with a ring gear, and the differential carrier sets the pinion mechanism onto the differential case to engage the pinion gear with the ring gear.

BRIEF DESCRIPTION OF THE DRAWING FIGURES

Additional features and details of the present invention will become more apparent from the following detailed description considered with reference to the accompanying drawing figures in which like elements are designated by like reference numerals and wherein.

DETAILED DESCRIPTION OF THE INVENTION

Figure 1:
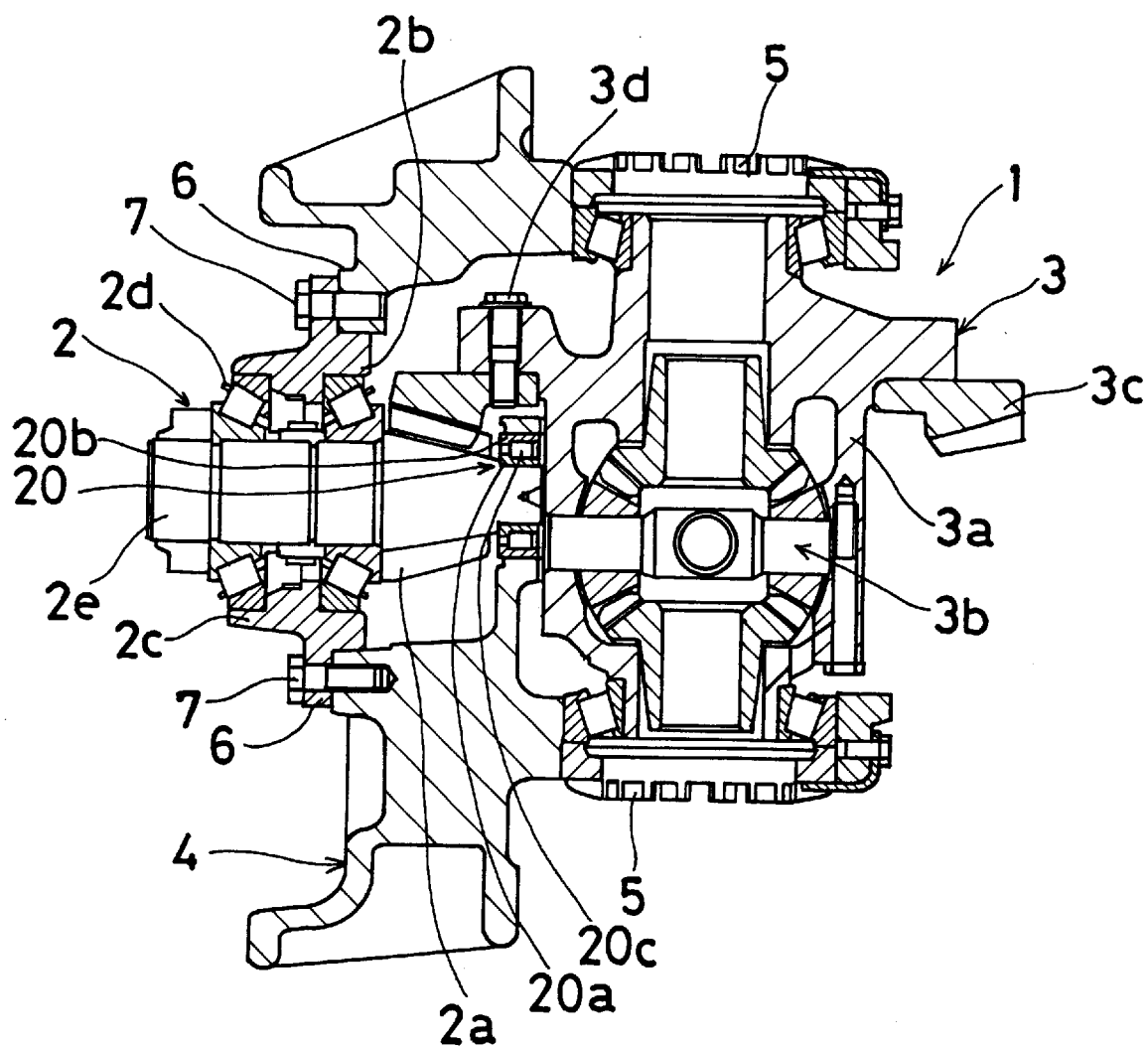
FIG. 1 is a cross-sectional view of a differential gear device according to the present invention.

With reference initially to FIG. 1, the differential gear device 1 according to the present invention can be in the form of a limited slip differential. The differential gear device 1 includes a pinion mechanism 2, a differential case 3, and a differential carrier 4. The pinion mechanism 2 is provided with a pinion shaft 2e which transmits drive power from the engine through a transmission. The pinion shaft 20e includes a stepped portion 2f. A pinion gear 2a is formed on the pinion shaft 2e. The pinion shaft 2e and the pinion gear 2a are mounted in or connected to a pinion case 2c through several bearings 20, 2b, 2d so that the pinion shaft 2e and the pinion gear 2a are rotatable.

The differential case 3 includes a differential case body 3a, a differential mechanism 3b disposed in the differential case body 3a, and a ring gear 3c fixed to the differential case body by a bolt 3d. The differential mechanism 3b is connected with the right and left axles of the vehicle. The differential carrier 4 sets the position of the pinion mechanism 2 onto the differential case 3 so that the pinion gear 2a meshes with the ring gear 3c. The pinion case 2c is connected to the differential carrier 4 by way of bolts 7.

Engine power produced during operation of the engine is transmitted to the pinion shaft 2e through the transmission to rotate the pinion gear 2a. The rotation of the pinion gear 2a is transmitted to the differential case body 3a through the ring gear 3c. When a difference in rotational speed between the right and left wheel axles occurs, the differential mechanism 3b absorbs the rotational speed differential between the right and left wheel axles.

The contacting condition of the pinion and ring gears has an affect upon strength of the gears and the noise produced by the gears. Thus, when the pinion mechanism 2 is installed in the differential carrier 4, the contacting condition of the pinion gear 2a and the ring gear 3c should preferably be appropriately adjusted. Initially, after the differential gear device 1 is assembled, a nut 5 is rotated. The nut 5 is provided with a screw so that by rotating the nut 5, the differential case 3 is moved up and down to adjust the backlash between the pinion gear 2a and the ring gear 3c. The surface of the ring gear 3c is painted in order to check the contact between the gears. As the pinion gear 2a rotates, the paint becomes worn and comes off in the regions where the pinion gear 2a meshes with the ring gear 3c. It is thus possible to examine the contacting condition between the pinion gear 2a and the ring gear 3c through observation of the paint wear.

Figure 2:
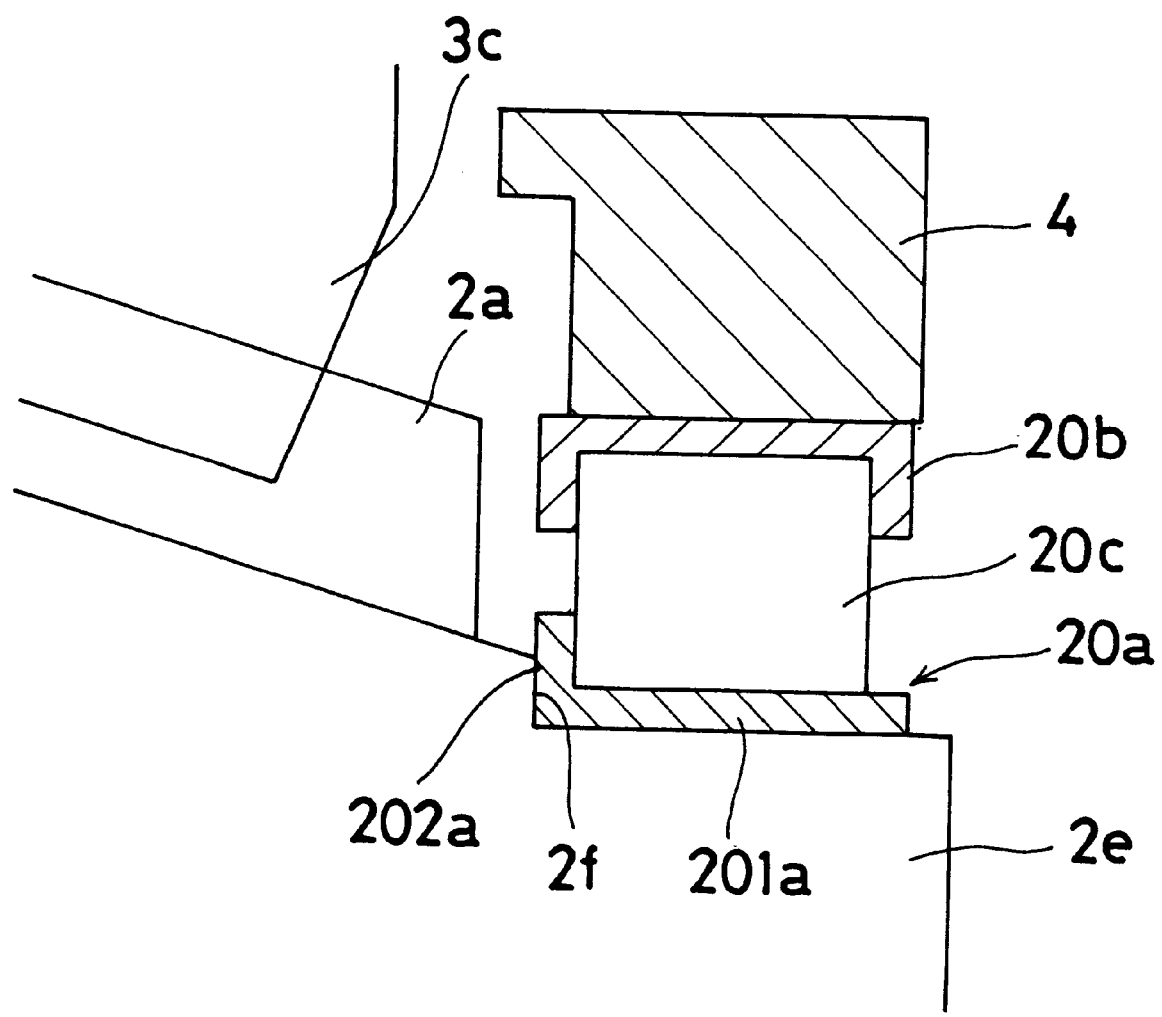
FIG. 2 is an enlarged cross-sectional view of a portion of the differential gear device shown in FIG. 1.

FIG. 2 is an enlarged cross-sectional view of the portion of the differential gear device in the region of the bearing 20 that is located at the forward end of the pinion shaft 2e. The bearing 20 is comprised of an inner race 20a, an outer race 20b and an element 20c disposed between the inner race 20a and the outer race 20b. In the illustrated embodiment of the present invention, the element 20c is a roller. The inner race 20a includes a race portion 201a fixed to the tip of the pinion shaft 2e and a stopper 202a located at the pinion gear 2a side. The race portion 201a and the stopper 202a are formed in one-piece. The outer race 20b includes two radially inwardly extending stoppers located at opposite ends of the outer race 20b.

The stopper 202a on the inner race 20a extends generally radially outwardly with respect to the pinion shaft 2e. The stopper 202a is formed only at the pinion gear 2a side of the race portion 201a and is not formed at the opposite end of the race portion 201a. That is, the stopper 202a is not provided at the tip end side or free end side of the pinion shaft 2e. Thus, the inner race 20a only engages one of the axial end surfaces of the roller 20c. The outer race 20b, on the other hand, engages both end surfaces of the roller 20c. The outer race 20b is tightly inserted into the differential carrier 4 so as to be held by the differential carrier. As can be readily appreciated, the inner race 20a can be pulled out or separated from the roller 20c because of the absence of a stopper at the tip side or free end side of the pinion shaft 2e.

If the contacting condition between the pinion gear 2a and the ring gear 3c is outside of a predetermined range, the contacting condition between the pinion gear 2a and the ring gear 3c is adjusted by changing the thickness of the coupling part or shim 6 located between the retainer 2c and the differential carrier 4.

In this embodiment, the bearing 20 formed on the tip of the pinion gear 2a is provided with the inner race 20a which is fixed on or connected to the tip of the pinion gear 2a by compression and the outer race 20b which is placed in the interior of the differential carrier 4. The roller 20c disposed between the inner race 20a and the outer race 20b is set up so that it does not come off from the outer race 20b when the pinion mechanism 2 is moved to the left in FIG. 2 to remove the pinion mechanism 2 from the differential gear device. Rather, only the inner race 20a moves together with the pinion mechanism 2, and the outer race 20b and the roller 20c stay in the differential carrier 4.

To adjust the contacting condition of the pinion gear 2a and the ring gear 3c, the thickness of the shim 6 between the retainer 2c and the differential carrier 4 is adjusted and the retainer 2c is then fixed to the differential carrier 4 by the bolt 7. This adjustment is repeated until the contacting condition of the pinion and ring gears becomes suitable.

In accordance with the present invention, the contacting condition between the ring gear 3c and the pinion gear 2a can be advantageously adjusted in a short time. Further it is not necessary to change the measurements of the other parts of the differential gear device 1. Rather, it is only necessary to change the bearing and the thickness of the shim 6.

Further, because the roller 20c is supported at the outer race side, the space in the radial direction of the roller 20c becomes larger. This space makes it easier to pull out the pinion mechanism 2 from the differential gear device 1.

Figure 3:
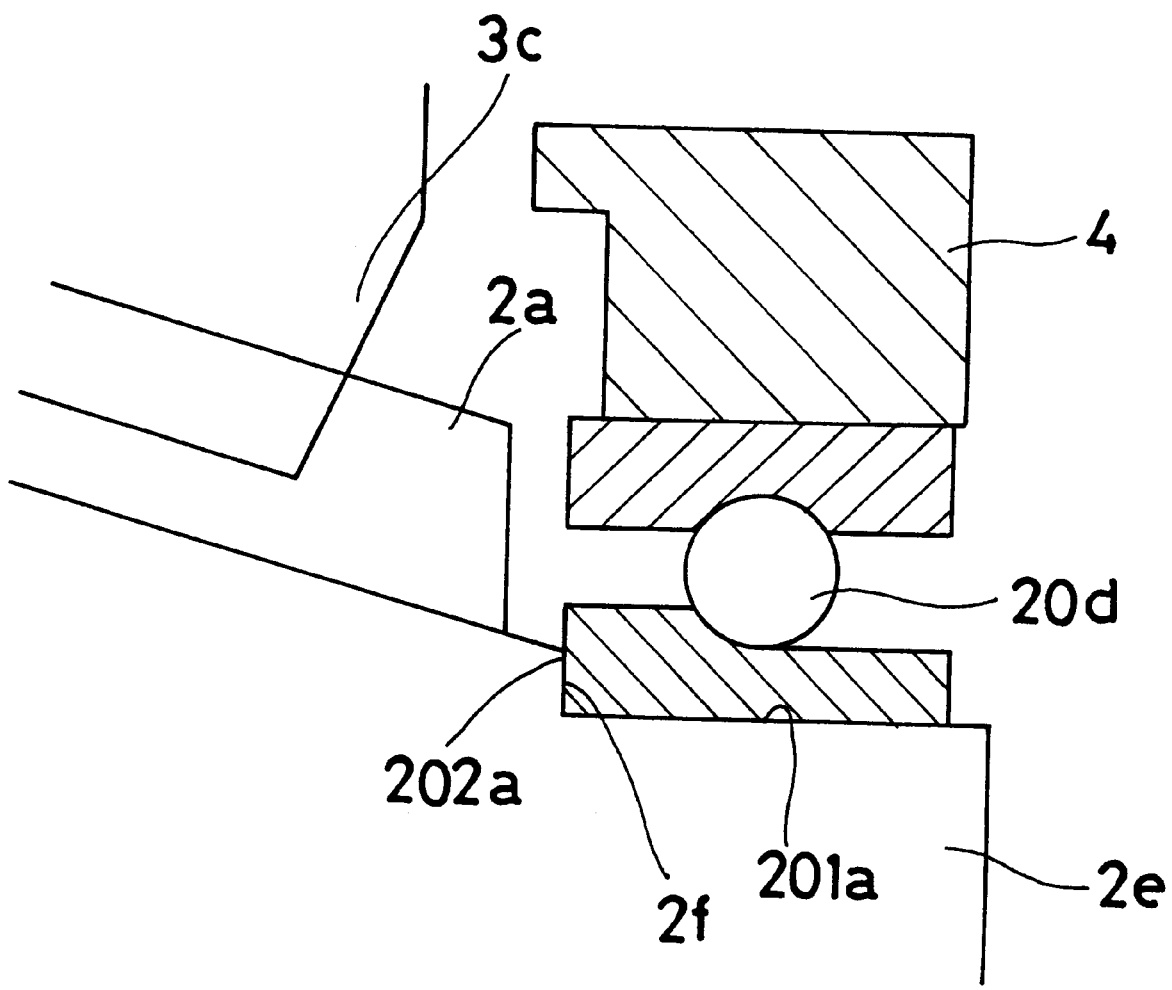
FIG. 3 is an enlarged cross-sectional view of a portion of a differential gear device similar to FIG. 2, but illustrating the use of a ball.

In the embodiment of the invention described above, the bearing that is used is a roller bearing. However, the invention is not necessarily limited in this regard. For example, a ball bearing 20d as shown in FIG. 3 may be used instead of the roller bearing.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A differential gear device comprising:
    a pinion mechanism for transmitting driving torque, the pinion mechanism including a pinion shaft and a pinion gear;
    a bearing provided at on one end of the pinion shaft, the bearing including a cylindrical inner race having open opposite ends and a cylindrical outer race, the inner race of the bearing being fixed on the pinion shaft and being removable from the outer race of the bearing;
    a differential case in which a differential mechanism is disposed, the differential case being provided with a ring gear; and
    a differential carrier which sets the pinion mechanism onto the differential case to engage the pinion gear with the ring gear.

2. A differential gear device as recited in claim 1, wherein the outer race of the bearing is fixed to the differential carrier.

3. A differential gear device as recited in claim 1, including a ball located between the inner race and the outer race.

4. A differential gear device as recited in claim 1, including a roller located between the inner race and the outer race.

5. A differential gear device as recited in claim 4, wherein the roller of the bearing is supported by the outer race when the inner race is removed from the outer race.

6. A differential gear device as recited in claim 1, wherein the outer race is held by the differential carrier.

7. A differential gear device as recited in claim 1, including an element located between the inner race and the outer race, said element being either a roller or a ball, said element including axially facing opposite end surfaces, said inner race engaging one of the end surfaces of the element.

8. A differential gear device as recited in claim 1, including an element located between the inner race and the outer race, said element being either a roller or a ball, said element including axially facing opposite end surfaces, said outer race engaging one of the end surfaces of the element.

9. A differential gear device as recited in claim 1, including an element located between the inner race and the outer race, said element being either a roller or a ball, said element including axially facing opposite end surfaces, said outer race engaging both end surfaces of the element and the inner race engaging only one of the end surfaces of the element.

10. A differential gear device comprising:
    a pinion mechanism for transmitting driving torque, the pinion mechanism including a pinion shaft with a stepped portion and a pinion gear;

a bearing provided at on one end of the pinion shaft, the bearing including an inner race having opposite ends, an outer race and an element located between the inner race and the outer race, the end of the inner race located farthest from said stepped portion being open to permit the pinion shaft to extend though the open end of the inner race, the element having oppositely facing end surfaces, one of the inner race and the outer race engaging only one of the end surfaces of the element;

a differential case in which a differential mechanism is disposed, the differential case being provided with a ring gear; and a differential carrier which sets the pinion mechanism onto the differential case to engage the pinion gear with the ring gear.

11. A differential gear device as recited in claim 10, wherein the outer race of the bearing is fixed to the differential carrier.

12. A differential gear device as recited in claim 10, wherein the element located between the inner race and the outer race is a ball.

13. A differential gear device as recited in claim 10, wherein the element located between the inner race and the outer race is a roller.

14. A differential gear device as recited in claim 10, wherein the inner race engages only one of the end surfaces of the element.

15. A differential gear device in claim 14, wherein the outer race engages both end surfaces of the element.

16. A differential gear device as recited in claim 10, wherein the outer case is held by the differential carrier.

* * * * *

UNITED STATES PATENT AND TRADEMARK OFFICE
CERTIFICATE OF CORRECTION

PATENT NO. : 5,913,745
DATED : June 22, 1999
INVENTOR(S) : INAGAKI, et al.

It is certified that error appears in the above-identified patent and that said Letters Patent is hereby corrected as shown below:

On the cover page, the following is added:

[30]   Foreign Application Priority Data
      Apr. 25, 1996   [JP]   Japan ................. 8-105818

Signed and Sealed this

Fourth Day of January, 2000

Attest:

*Attesting Officer*

*Acting Commissioner of Patents and Trademarks*